United States Patent [19]
Reichert

[11] Patent Number: 5,489,185
[45] Date of Patent: Feb. 6, 1996

[54] PALLET LOAD UNLOADER AND FEEDER

[75] Inventor: Donald G. Reichert, Tarpon Springs, Fla.

[73] Assignee: ABC Packaging, Inc., Tarpon Springs, Fla.

[21] Appl. No.: 67,682

[22] Filed: May 26, 1993

[51] Int. Cl.$^6$ ................................. B65G 59/00
[52] U.S. Cl. ................. 414/795.9; 414/799; 198/345.3; 198/468.11
[58] Field of Search .............................. 198/341, 345.3, 198/433, 464.3, 468.11; 414/799, 795.9, 796.2, 796.3, 796.8, 798.9, 417

[56] References Cited

U.S. PATENT DOCUMENTS

| | | | |
|---|---|---|---|
| 2,918,161 | 12/1959 | Edmonds et al. | 198/433 |
| 3,055,478 | 9/1962 | Du Broff et al. | 414/795.9 |
| 3,722,719 | 3/1973 | Frank | 414/417 |
| 3,999,666 | 12/1976 | Lloyd et al. | 414/796.7 |
| 4,197,046 | 4/1980 | Shank | 414/799 |
| 4,220,076 | 9/1980 | Moen . | |
| 4,239,432 | 12/1980 | Richardson | 414/799 |
| 4,249,849 | 2/1981 | Hinchcliffe | 414/417 |
| 4,303,405 | 12/1981 | Reichert . | |
| 4,400,128 | 8/1983 | Milligan | 414/417 |
| 4,430,039 | 2/1984 | Boucherie | 414/417 |

*Primary Examiner*—Michael S. Huppert
*Assistant Examiner*—Gregory A. Morse
*Attorney, Agent, or Firm*—Hopkins & Thomas

[57] ABSTRACT

A pallet unloading apparatus for removing stacks from a pallet has a conveyor for conveying a pallet in front of a pusher mechanism and a stop member then stops the pallet. The pusher mechanism is activated to push the stacks one at a time off of the pallet. When a first set of stacks has been removed from the pallet the pusher mechanism is then retracted and the apparatus moves the pallet forward to where a second set of stacks is in front of the pusher mechanism and the pallet is then stopped by a second stop member. When the pallet is empty, the second stop member retracts and the empty pallet is passed beyond the pusher mechanism while a loaded pallet moves into position.

19 Claims, 4 Drawing Sheets

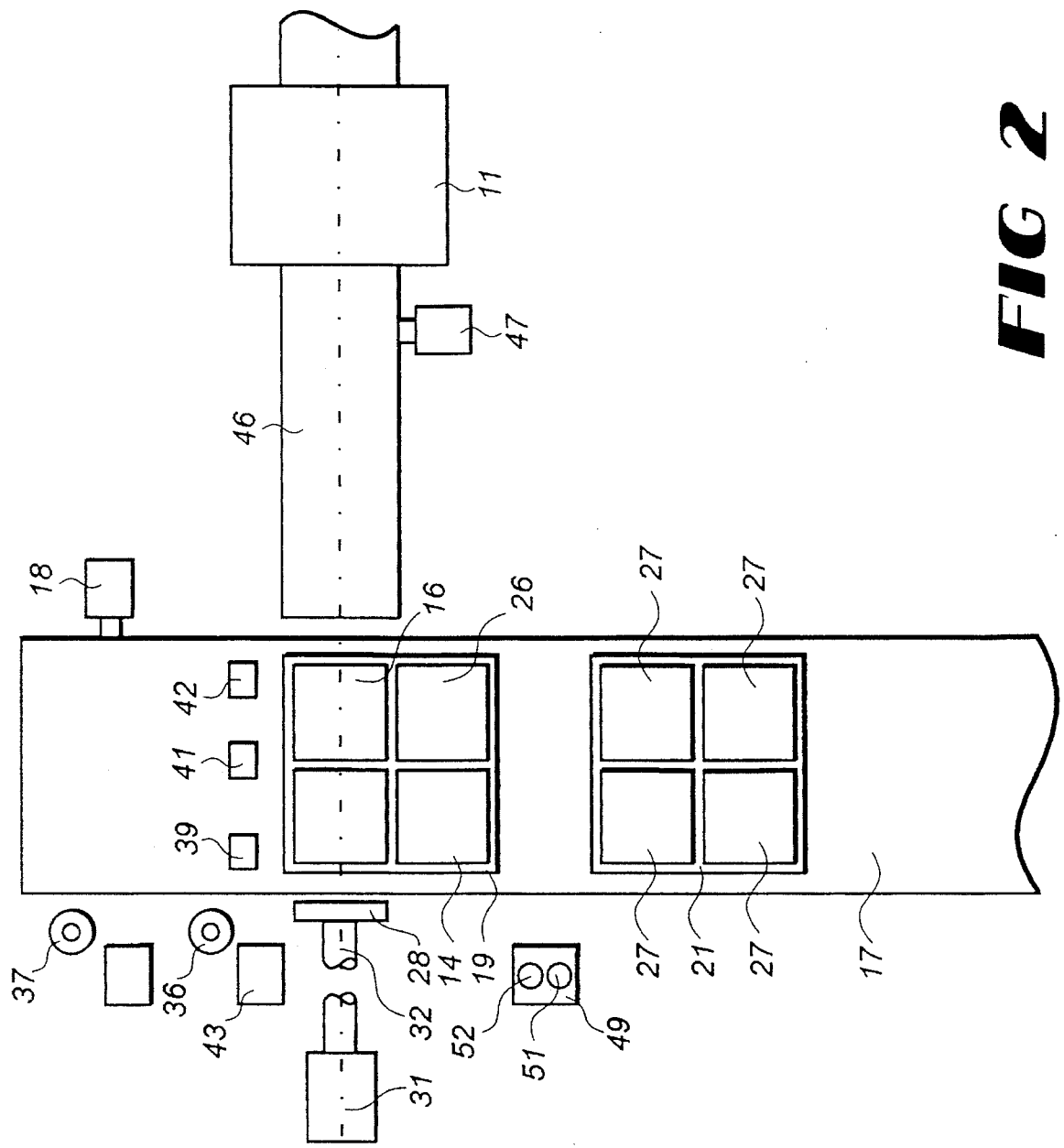

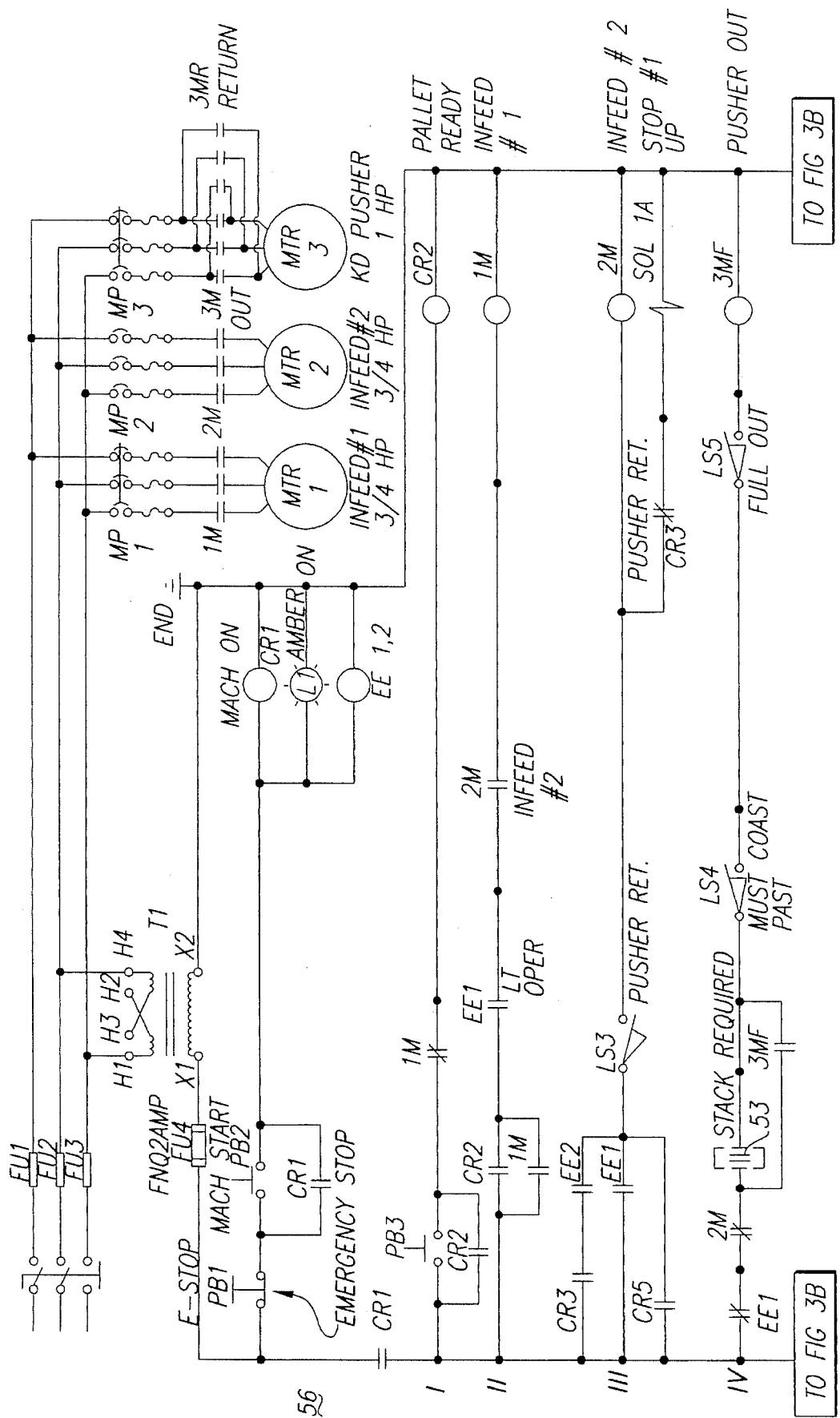

PALLET LOAD UNLOADER AND FEEDER

FIELD OF THE INVENTION

This invention relates to the erection of containers from flat blanks and, more particularly, to a method and apparatus for delivering flat blanks to an erection apparatus.

BACKGROUND OF THE INVENTION

In general, prior art arrangements for forming or erecting containers, such as cardboard cartons from flat blanks have relied upon hand delivery of the blanks to a magazine which forms part of an erecting machine. The magazine, in which the blanks or flats are stacked includes means for delivering the top blank of the stack to the erection apparatus and also includes elevator means for indexing the stack upward, one flat thickness at a time, as the flats are removed from the top of the stack.

To achieve a practical production rate, it is desirable to place a large stack of flats on the elevator in the magazine. However, such stacks can be quite heavy, thereby requiring the operator to lift such a heavy weight, or else to feed the flats into the magazine as several smaller stacks. In either case, the operator quickly becomes fatigued, and he also runs the risk of injury if he attempts to lift stacks that are too heavy. Further, the production rate is diminished by the operator's inability to place a complete stack upon the elevator in one movement. Once the indexing upward of the magazine and elevator has begun, it is no longer feasible to place flats on the elevator, and, in general, it is necessary that the operator wait until the elevator returns to its lowest, or magazine loading position. The operator then must load the magazine piecemeal while production is at a standstill and operation can only resume after he has finished loading.

It is a desideratum that any interruption of the production of finished carton be of very short duration, and, further, that the operator be spared, for reasons of safety and reduction of fatigue, the labor of loading the flats into the magazine by hand.

SUMMARY OF THE INVENTION

In a preferred embodiment of the invention, the apparatus thereof comprises a first conveyor and associated power means for moving pallets into a ready position in front of a pusher mechanism. Each pallet has four stacks of flats thereon, symmetrically arranged in a square array so that when the pallet is in the ready position, two stacks are located in front of the pusher mechanism. When the stacks are in the ready position, a switch is automatically activated to stop movement of the conveyor. A second conveyor and associated power means extends at approximately a right angle to the first conveyor along the axis of the pusher mechanism which is, itself, powered by suitable means such as a motor. This second conveyor leads to the erector apparatus, more particularly to the magazine in which the flats are to be stacked. In some cases this second conveyor may already be in place at the production site as part of the erection apparatus, and the first conveyor and pusher mechanism, as a separate entity, may be brought to the production site and placed in position When the magazine is in condition to receive a stack of flats, a switch is actuated to turn on the pusher mechanism, which then engages the second stack to push the first of the two aligned stacks off of the pallet and on to the second conveyor. The pusher pushes the stacks toward the magazine, and is stopped, after the first stack is on the second conveyor, which conveys the stack to the magazine. When the magazine needs more flats, the pusher and second conveyor are re-activated to deliver the second stack of flats into the magazine and the pusher is then automatically retracted. When the pusher reaches its fully retracted position, the first conveyor is activated to move the remaining pair of stacks on the pallet into the ready position, and the process can then be repeated. The entire process may be timed such that there is little interruption of production. Thus, the first conveyor moves a pair of stacks in front of the pusher and stops, leaving the stacks in a ready position while the magazine is being emptied. When the magazine elevator returns to its lower position, it signals the pusher and the second conveyor to move the stacks along the second conveyor until the lead stack is in the magazine, as previously described. Thus, there is continuous operation of the overall system with the erector being the final component thereof. In the case where the second conveyor and erector are part of the in place production facility, the second conveyor may be turned on manually once the first stack has been pushed from the pallet on to the conveyor.

Accordingly, it is an object of the present invention to provide an apparatus for automatically and continuously supplying stacks of flats to an erector mechanism with a minimum interruption of the production of erected cartons.

Another object of the invention is to provide such an apparatus which minimizes the physical involvement of an operator, thereby relieving such operator of excess physical effort and potential injury.

These and other objects, features, and advantages of the present invention will be readily apparent from the following detailed description when read in conjunction with the accompanying drawings, wherein like reference characters designate corresponding parts throughout the several views.

BRIEF DESCRIPTION OF THE DRAWINGS

FIG. 2 is a diagrammatic plan view of the apparatus of FIG. 1; and

DESCRIPTION OF THE PREFERRED EMBODIMENT

Figure 1:
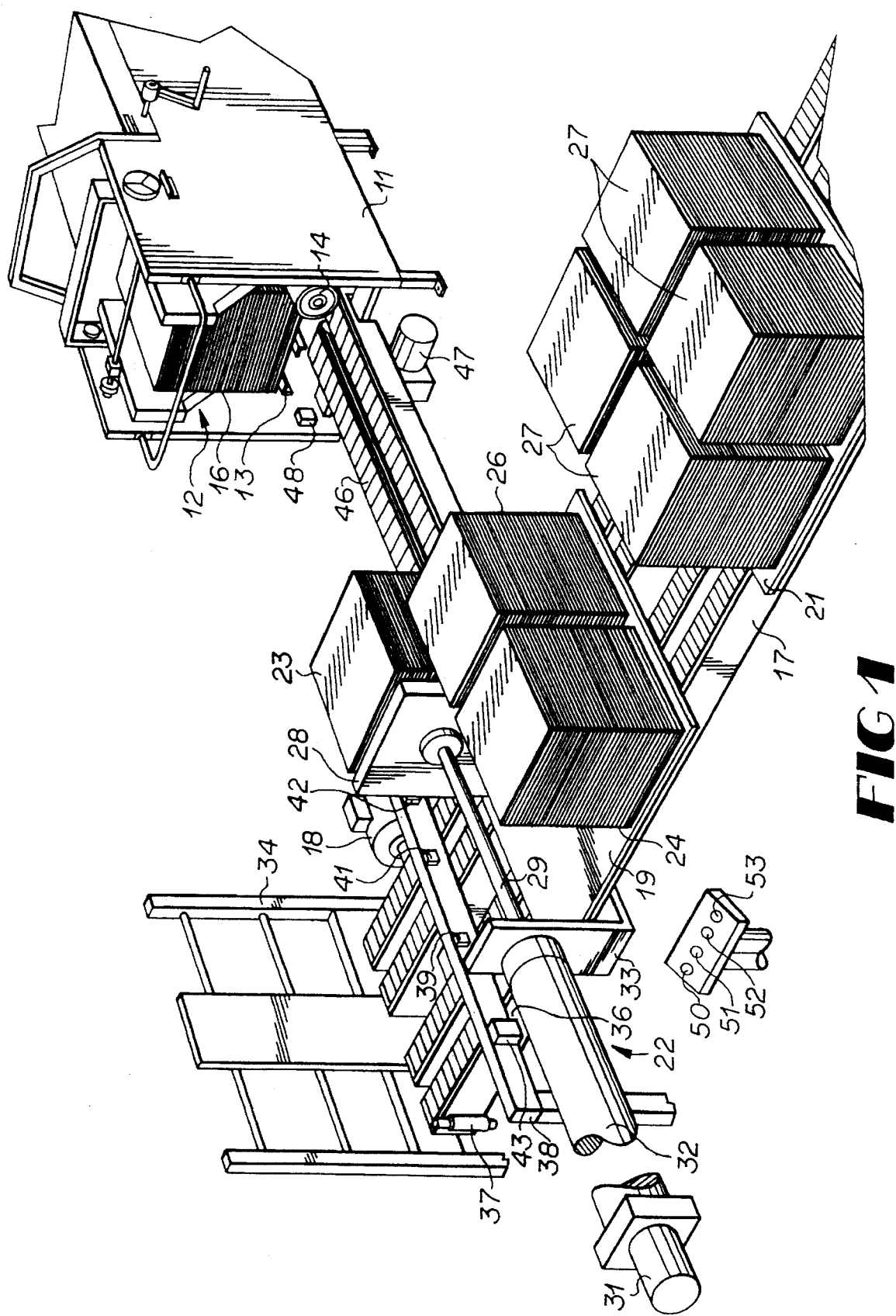
FIG. 1 is a perspective view of an illustrative embodiment of the invention.

Referring now in detail to the preferred illustrative embodiment of the present invention as depicted in FIG. 1, an erector apparatus 11 has a magazine 12 which includes an elevator 13 powered by suitable means such as motor 14, capable of indexing elevator 13 up in incremental steps. In FIG. 1, a stack of flats 16 to be erected into cartons is shown in the magazine. In operation, as explained hereinbefore, motor 14 indexes elevator 13 upward one flat thickness at a time as the flats are pulled off the top of stack 16, one flat at a time, and delivered to the erecting portion of erector 11.

The apparatus of the invention for delivering stacks of flats to the conveyor leading to the magazine 12 comprises a first or pallet conveyor 17 which preferably is an endless belt type powered by suitable means such as motor 18 (MTR2). The designation of motor 18 as MTR2 is used in the explanation of the wiring diagram of FIG. 3, and other components discussed hereinafter bear similar designations. These designations are standard for wiring diagrams and are intended to facilitate the explanation thereof. Conveyor 17 conveys pallets 19, 21 and subsequent others to a ready position in front of a pusher assembly 22. Each of pallets 19, 21 is loaded with a square array of stacks of flats. Thus, pallet 19 has stacks 23, 24, and 26 still on it, while stack 16 has been removed from pallet 19 and conveyed to and deposited in magazine 12, as will be discussed hereinafter. In like manner, pallet 21 has stacks 27, 27 thereon.

Pusher assembly 22 comprises a flat pusher plate 28 mounted on the end of an actuating rod 29. Rod 29 is driven along an axis extending transversely of conveyor 17 by suitable drive means, such as motor 31 (MTR3) and gearing 32, mounted on a bracket 33 which, in turn, is mounted on the side of conveyor 17. The drive means for pusher plate 28 and rod 29 may take any of a number of forms, such as, for example, a screw drive, a gearing arrangement for translating rotary to linear motion, or a rack and pinion arrangement, while electrical motor 31 (MR3) can be replaced by a hydraulic or other fluid type motor, for example. Pusher assembly 22 moves pusher plate 28 along the aforementioned axis in both directions under the influence of proper actuating devices.

Conveyor 17 extends beyond the pallet ready position in front of pusher assembly 22 for a distance somewhat greater than the length of a pallet, and the end is blocked by a suitable gate means 34. Gate means 34 is intended to be representative of any number of possible devices for blocking and/or retrieving empty pallets. Located along the extended portion of conveyor 17 are first and second electrically actuated pallet stop 36, controlled by solenoid SOL1A and stop 37, controlled by solenoid SOL2A, and respectively, shown in FIG. 1 as simple solenoids, mounted on the side of conveyor 17, but which may take any of a number of suitable forms. Pallet stop 36 is positioned to stop pallet 19, for example, when flat stacks 16 and 23 are in front of pusher plate 28 and aligned therewith. This is the first ready position for pallet 19. Pallet stop 37 is spaced from pallet stop 36 a distance such that pallet 19 is stopped when stacks 24 and 26 are in front of pusher plate 28 and aligned therewith. This is the second ready position of pallet 19.

Mounted on a framework 38, which extends above and across conveyor 17, are spaced limit switches 39 (LS3), 41 (LS4), and 42 (LS5). Switches 39, 41 and 42, the operation of which will be explained hereinafter, are closely adjacent the path of pusher plate 28 and are designed to be sequentially activated thereby. Also mounted on framework 38 is an electric eye housing 43 containing two electric eyes EE1 and EE2, which detect the presence or absence of a pallet as will be discussed hereinafter.

As thus far described, the arrangement of conveyor 17 and pusher assembly 22 comprises a separate entity or module for delivering stacks to a position where they can be removed and conveyed to erector 11, and the means for conveying the stacks to the erector 11 may be considered as another element of the modular construction.

Extending outward or sidewise from conveyor 17, at substantially 90° or normal thereto and toward erector 11 is a second or stock conveyor 46, which, like conveyor 17, may be an endless belt powered by suitable means such as motor 47 (MTR1). Conveyor 46 is axially aligned with pusher assembly 22 and its top surface is preferable coplanar with the top surface of conveyor 17. The other end of conveyor 46 is preferably co-planar with elevator 13 when it is in its down position, ready to receive a stack of flats from conveyor 46. In order to facilitate movement of a stack of flats from conveyor 46 to elevator 13, conveyor 46 may have a downward slope from conveyor 17 to erector 11. A "stack required" detector 48 is mounted adjacent magazine 12 for signalling when the magazine 12 is empty and is ready to receive a stack.

The illustrative embodiment of the invention depicted in FIGS. 1 and 2 is electrically powered, and for controlling the components of the system, a control box 49 having switches 50 (PB1), 51 (PB2), 52 (PB3), and 53 is placed adjacent the apparatus. For simplicity, the various electrical connections of the components are not shown. While electrically powered operation is preferred, it is to be understood that other types of power, such as, for example, compressed air or hydraulic, may be used for some or all of the various powered components and functions.

Figure 3B:
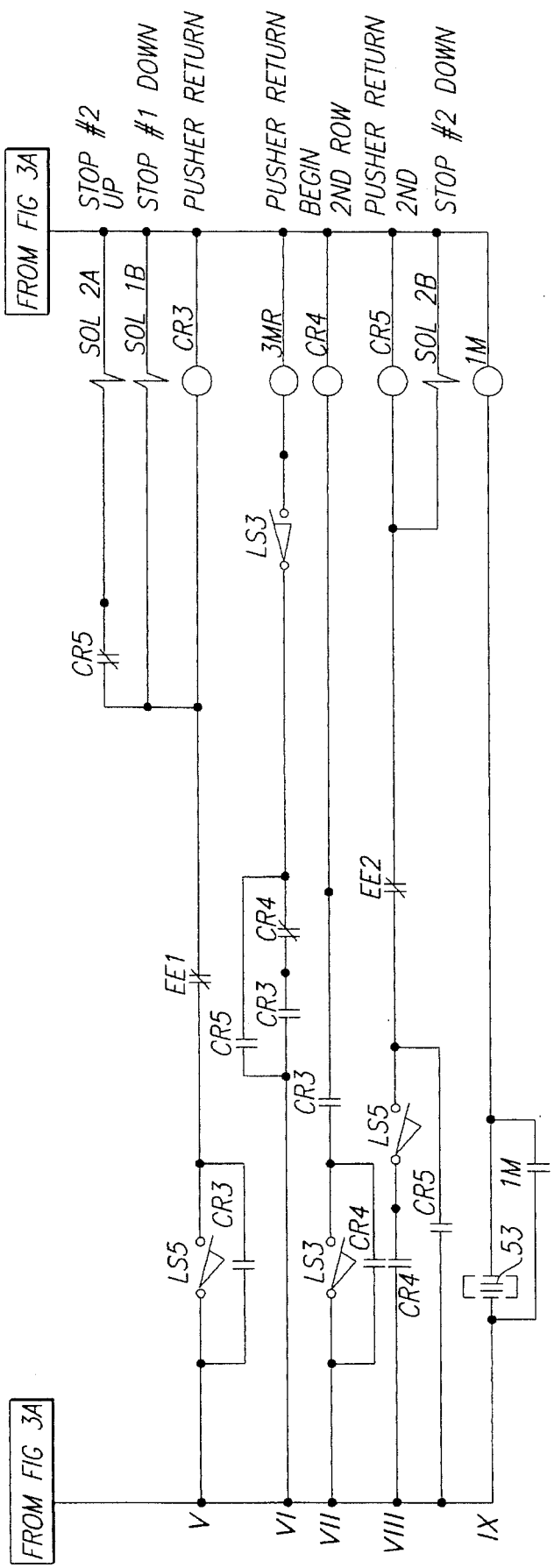
FIG. 3 is a wiring diagram of the control arrangement for the apparatus of FIGS. 1 and 2, in which conventional wiring diagram designations of the components are used.

The operation of the apparatus of FIGS. 1 and 2 will be more readily understood by reference to the wiring diagram of FIG. 3. In FIG. 3, three phase power is supplied through circuit breakers FU1, FU2, and FU3 to motors MTR1, MTR2, and MTR3, through the contacts of control relays 1M, 2M, and 3M, respectively. Power is also applied to the control circuit 56 through transformer T1. When it is desired to supply stacks to magazine 12, the operator activates push button switch PB2 and power is supplied through emergency stop switch PB1 through PB2 to control relay CR1 the contacts of which close to by-pass PB2 and to supply power to the remainder of the circuit. At the same time, amber lamp L1 lights and power is supplied to electric eyes EE1 and EE2. At this point the apparatus is ready to operate.

Operation is commenced when the operator closes push button switch PB3, shown on line I, supplying power through normally closed relay contacts 1M to control relay CR2. When CR2 is activated, its contacts, shown in Lines I and II, close. If there is empty space for a pallet in front of pusher mechanism 22, EE1 as shown on lines II and III, likewise closes. Limit switch LS3 is normally closed when pusher plate 28 is fully retracted, hence, when EE1 closes, power is applied to relay 2M, energizing infeed motor MTR2 and simultaneously closing contacts 2M in line II, energizing motor relay 1M and thus infeed motor MTR1. Conveyor 17 then proceeds to move pallet 19 into the ready position in front of pusher assembly 22, with stacks 16 and 23 axially aligned therewith. Also, stop 36 (SOL 1A) is activated to prevent pallet 19 from moving past the first ready position. When pallet 19 is thus properly positioned, EE1 is blocked and power to 1M and 2M is cut off, thereby stopping motor MTR1 and MTR2, EE1 has a second pair of contacts (line IV) which close when EE1 is blocked by the pallet, and 2M likewise has a second pair of contacts (line IV) which close when 2M is de-energized. When it is desired to convey stack 16, for example, to the erector 11, the operator actuates switch 53 (line IV) and power is applied through normally closed switches LS4 and LS5 to pusher motor relay 3MF (line IV). This action also turns on infeed motor MTR1 through motor relay 1M (line IX) to start conveyor 46. When 2MF and 1M make, switch 53, which is normally a spring loaded push button switch, is by-passed, as shown in lines IV and IX.

Pusher motor MTR3 pushes stack 16 off of pallet 19 onto conveyor 46, and continues to move forward until limit switch LS4 is opened by, for example, pusher plate 28, at which time relay 3MF is de-activated. However, the pusher mechanism 22 is so designed that pusher plate 28 coasts past LS4, thereby allowing it to close again. Thus, stack 16 proceeds to erector 11 while stack 23 is positioned in readiness to be pushed onto conveyor 46. When stack 16 has been fully depleted, the operator again, pushes switch 53 and pusher motor MTR3 is energized to push stack 28 onto conveyor 46. Motor MTR3 continues to operate until pusher mechanism 22, and preferably pusher plate 23, opens limit switch LS5 (line IV) and stops motor MTR3. Limit switch LS5 has a second pair of contacts (line V) which close when the first pair of contacts (line IV) open, thereby energizing control relay CR3, which reverses motor MTR3, and pusher plate 28 is then retracted to a position where the pallet, with stacks thereon, is free to move forward. At the same time, stop SOL1 is retracted and stop SOL2 is activated and raised (line V). CR3 also bypasses limit switch LS5 contacts, as shown in line V. When pusher plate 28 is fully retracted, limit switch LS3 (lines III, VI, and VII) is closed and infeed motor MTR2 is activated through closed control relay CR3 contacts and normally closed electric eye contacts EE2 through motor relay 2M (line III). Conveyor 17 then moves pallet 19 until stacks 24 and 26 are axially aligned with pusher assembly 22, at which time EE2 is blocked by the empty portion of pallet 19 and MTR2 is stopped. In addition, SOL2, which is in its stop position, stops pallet 19 from moving past the second ready position.

When erector magazine 12 is ready to receive another stack, as signalled by detector 48, the operator again activates switch 53. If desired, especially in a volume production environment, switch 53 and detector 48 can be linked so that switch 53 is automatically actuated when detector 48 signals an empty magazine. When switch 53 is actuated, pusher motor MTR3 commences to move pusher plate 28 out, pushing stack 26 onto conveyor 46. At the same time, control relay CR4 is energized, bypassing limit switch LS3 contacts (line VII). The process then continues as described hereinbefore for stacks 16 and 23. When pusher plate 28 has been fully extended, limit switch LS5 closes, and control relay CR5 is activated (line VIII). At the same time, stop SOL2 is deactivated and drops down and pusher motor MTR3 is activated through CR5 contacts and normally closed LS3 contacts (line VI). When the pusher plate 28 is fully retracted, LS3 contacts (line VI) open and motor relay 3MR is de-activated. At this time, infeed motor MTR2 is activated through CR5 contacts and closed limit switch LS3 (line III), and now empty pallet 19 is conveyed out of the pusher assembly area toward gate 34, where it can be removed. The system is then ready to start a new cycle with following pallet 21 and stacks 27, 27.

It is to be understood that the entire operation, as just described may be made substantially fully automatic so that merely pressing a starting switch would be all that was necessary to start the processing of a continuous sequence of pallets. Additionally, where the infeed conveyor 17 and the pusher assembly 22 are mounted next to or attached to an existing conveyor and erector apparatus, the two components may be wired together with a minimum of effort to achieve the operation hereinbefore described.

From the foregoing it can be seen that the apparatus of the invention practically eliminates any physical labor on the part of the operator, either when loading stacks on the conveyor leading to the erector or when loading stacks directly into the magazine. As pointed out before, the pace of the production of erected cartons is materially increased by thus relieving the operator from heavy labor.

It will be obvious to those skilled in the art that many alterations to or variations of the embodiment here chosen for the purpose of illustrating the present invention without departure from the spirit and scope thereof. For example, while stacks of flats have unloaded from the pallets in the foregoing discussion of the illustrative embodiment, stacks of other types of material, or even boxes or other individual work pieces may be unloaded from pallets by the apparatus of the invention.

I claim:

1. An apparatus comprising an erector apparatus for erecting boxes and having an elevator movable from a lowered position to lifted positions and an unloading apparatus for unloading pallets having stacks of work pieces arranged thereon and for serially delivering the stacks of work pieces to said elevator of said erector apparatus, said elevator receiving each stack when said elevator is in its lowered position, the stack being thereafter lifted by said elevator so that topmost work pieces in each lifted stack are successively removed from the lifted stack on the elevator, the improvement comprising said unloading apparatus having:

first conveyor means for conveying pallets and having first and second ends, said pallet having a pair of transversely aligned stacks of work pieces thereon;

first driving means for driving said first conveyor means;

a pusher assembly adjacent said first conveyor means intermediate the ends thereof, said pusher assembly comprising a pusher member for engaging one of said work pieces on the pallet and pusher drive means for driving said pusher member substantially transversely of said first conveyor means;

first stop means for engaging and holding a pallet in a first ready position adjacent said pusher assembly whereby said one stack of work pieces on the pallet is transversely aligned with said pusher assembly;

means for activating said pusher drive means sufficiently to cause said pusher member to engage said one stack of work pieces on the pallet and to push said one stack sufficiently that said one stack urges the other stack off of the pallet and then to urge said one stack urged off of the pallet;

means for stopping said pusher drive means after the pair of stacks of work pieces have been urged from the pallet; and means for directing said stacks of work pieces serially into said elevator.

2. An apparatus as claimed in claim 1 and further including first detecting means for detecting when the pallet is in the first ready position.

3. An apparatus comprising an erection apparatus having an elevator movable from a lower position to lifted positions for unloading pallets having stacks of work pieces arranged thereon for serially delivering the stacks of work pieces to said elevator of said erector apparatus when said elevator is in its lowered position and for being thereafter lifted by said elevator so that successive topmost work pieces in the lifted stack are successively removed from the lifted stack on the elevator, the improvement comprising an unloading apparatus having:

first conveyor means for conveying pallets and having first and second ends;

first driving means for driving said first conveyor means;

a pusher assembly adjacent said first conveyor means intermediate the ends thereof, said pusher assembly comprising a pusher member for engaging work pieces on the pallet and pusher driver means for driving said pusher member substantially transversely of said first conveyor means;

first stop means for engaging and holding a pallet in a first ready position adjacent said pusher assembly whereby at least one stack of work pieces on the pallet is aligned with said pusher assembly;

means for activating said pusher drive means to cause said pusher member to engage said stack of work pieces on the pallet and to push that stack off of the pallet;

means for stopping said pusher drive means after the stack of work pieces has been removed from the pallet;

means for directing said stack of work pieces serially into said elevator;

means for reversing said pusher drive means after the stack of work pieces in the first ready position has been removed from the pallet; and means for arresting said pallet in a second ready position and for causing said pusher member to return to a retracted position until the pallet with a stack of work pieces in a second position thereon is moved on said first conveyor means to a subsequent position with respect to said pusher member, and means for causing said pusher drive means to be extended and retracted for urging the stack of work pieces in said second position onto the stack conveyor.

4. An apparatus as claimed in claim 3 and further including means for causing said first stop means to release said pallet when said pusher member is retracted.

5. An apparatus as claimed in claim 4 and further comprising second stop means for engaging and holding a pallet in a second ready position adjacent said pusher assembly whereby at least one stack of work pieces on pallet is axially aligned with said pusher assembly.

6. An apparatus as claimed in claim 5 and further including second detector means for detecting when the pallet is in the second ready position.

7. The combination comprising an erector mechanism for erecting flats into cartons, said erector mechanism including a magazine for holding a stack of flats wherein the improvement comprises:

a stack conveyor for conveying stack of flats serially to the magazine;

a pallet conveyor for transporting pallets having transversely aligned stacks of flats arranged thereon, said pallet conveyor extending substantially normal and adjacent to the stack conveyor;

means for powering said pallet conveyor;

a pusher assembly aligned with the stack conveyor and on the opposite side of said pallet conveyor from the stack conveyor;

means for stopping said pallet moving on said pallet conveyor in a first ready position between said pusher assembly and said stack conveyor whereby said transversely aligned stacks on said pallet are successively aligned with said pusher assembly and the stack conveyor, said pusher assembly including pusher means for engaging one of said stacks of said transversely aligned stacks on the pallet and means for extending said pusher means to push said one of said stacks transversely against another of said stacks in said transversely aligned stacks such that the other of said stacks is pushed onto the stack conveyor and, thereafter, said one of said stacks is pushed onto said stack conveyor; and means for retracting said pusher means after the aligned stacks on the pallet in the first ready position have been pushed onto the stack conveyor.

8. A feeder apparatus as claimed in claim 7 wherein said means for stopping a pallet comprises first sensing means for sensing when the moving pallet has reached the first ready position.

9. A feeder apparatus as claimed in claim 7 and further including means for stopping said pallet moving on said pallet conveyor for a second time in a second ready position whereby a third stack of work flats on said pallet is aligned with said pusher assembly; and said pusher means being adapted to push said third stack off of said pallet and onto said stack conveyor when said pallet has been stopped a second time.

10. A feeder apparatus as claimed in claim 9 wherein said means for stopping a pallet in the second ready position comprises second means for sensing when the moving pallet has reached the second ready position.

11. A feeder apparatus as claimed in claim 7 and further including means for stopping said pusher means after a stack has been pushed onto the stack conveyor.

12. A feeder apparatus as claimed in claim 7 and further including means for indicating when the magazine is empty and ready to receive a stack.

13. An unloading and feeding apparatus for unloading pallets having stacks of material arranged thereon and for serially delivering the stacks to an additional apparatus, said unloading and feeding apparatus comprising:

first conveyor means for conveying said pallets, said first conveyor means having first and second ends;

first driving means for driving said first conveyor means;

a pusher assembly adjacent said first conveyor means and intermediate the ends of said first conveyor means, said pusher assembly comprising a pusher member for engaging one of said stacks on the pallet and pusher drive means for driving said pusher member in a direction along an axis substantially transversely of the said first conveyor means;

an elongated feeder conveyor means having one end adjacent said first conveyor means, said feeder conveyor means being substantially aligned with the direction of movement of said pusher member and substantially axially aligned with said pusher member;

first stop means for engaging and holding a pallet in a first ready position adjacent said pusher assembly whereby stacks on the pallet are axially aligned with said pusher assembly;

means for activating said pusher drive means to cause said pusher member to engage a stack of said stacks on the pallet for pushing one of said stacks off of the pallet and onto said feeder conveyor means;

means for stopping said pusher drive means after said one of said stacks have been removed from the pallet;

an elevator at the end of said feeder conveyor means for successively lifting said stacks upwardly off of said feeder conveyor and for discharging said material sequentially from each stack as it is lifted; and said second means for stopping a pallet in the second ready position comprises second sensing means for sensing when the moving pallet has reached the second ready position.

14. An unloading and feeding apparatus as claimed in claim 13 and further including means for indicating when the associated apparatus is in condition to receive a stack.

15. An unloading and feeding apparatus as claimed in claim 13 and further comprising means for reversing said pusher drive means after the last stack in the first ready position has been pushed from the pallet to cause said pusher member to retract sufficiently from the pallet that said pallet with additional stacks thereon may be moved into a second ready position by said first conveyor means, and means for releasing said pallet from said first ready position so that it is moved to said second ready position for subsequent action by said pusher member to move said additional stacks onto said second conveyor means.

16. The combination comprising: an erector machine and apparatus for delivering stacks of flat box blanks to said erector machine, said erector machine being of the type having an elevator movable between a lower position and an upper position, said elevator receiving a stack of said flat box blanks, when said elevator is in its lower position, so that the elevator, thereafter, lifts said stack of said blanks such that successive topmost blanks in said stack are removed one-at-a-time from the top of said stack for being manipulated in said machine, wherein the improvement comprising:

(a) a pallet conveyor disposed adjacent to said machine, said pallet conveyor having an entrance end portion and a pallet ready position, said pallet conveyor being adapted to transport at least one pallet, having thereon at least one stack of said flat box blanks, along a path of travel from said entrance end to said pallet ready position;

(b) means for arresting the travel of said pallet when said pallet is in said ready position on said pallet conveyor;

(c) a discharge member disposed adjacent to said conveyor for urging said stack of box blanks sidewise off of said pallet;

(d) a stack conveyor extending from said pallet conveyor for receiving said stack of box blanks when said stack is discharged from said pallet, and for delivering said stack of box blanks to said elevator, when said elevator is in its lowered position; and (e) control means for controlling the actuation and deactuation of said pallet conveyor and said discharge member and said stack conveyor and said elevator; and (f) said pallet carrying an additional three stacks of flat box blanks arranged with said first stack so that two of said stacks are aligned transversely and two of said stacks are aligned longitudinally of said pallet conveyor, said discharge means being movable across said conveyor pallet for urging the first pair of said stacks sidewise, one at a time onto said stack conveyor, said discharge member being movable across said pallet conveyor and said pallet conveyor being actuatable for moving said second pair of stacks into said ready position, said discharge means being movable sidewise against said second pair of stacks for urging each stack in said second pair of stacks onto said stack conveyor, behind said first pair of stacks, and said elevator being operative for receiving each of said stacks successively on said elevator when said elevator is in its lower position.

17. The combination comprising: an erector machine and an apparatus for delivering stacks of flat box blanks to said erector machine, said erector machine being of the type having an elevator movable between a lower position and an upper position, said elevator receiving a stack of said flat box blanks, when said elevator is in its lower position, so that the elevator, thereafter, lifts and stack of said blanks such that successive topmost blanks in said stack are removed one-at-a-time from the top of said stack for being manipulated in said machine, wherein the improvement comprising:

(a) a pallet conveyor disposed adjacent to said machine, said pallet conveyor having an entrance end portion and a pallet ready position, said pallet conveyor being adapted to transport at least one pallet, having thereon at least one stack of said flat box blanks, along a path of travel from said entrance end to said pallet ready position;

(b) means for arresting the travel of said pallet when said pallet is in said ready position on said pallet conveyor;

(c) a discharge member disposed adjacent to said conveyor for urging said stack of box blanks sidewise off of said pallet;

(d) a stack conveyor extending from said pallet conveyor for receiving said stack of box blanks when said stack is discharged from said pallet, and for delivering said stack of box blanks to said elevator, when said elevator is in its lowered position; and (e) control means for controlling the actuation and deactuation of said pallet conveyor and said discharge member and said stack conveyor and said elevator; and (f) said means for arresting the travel of said pallet including a pair of stops selectively engagable with the side of a pallet on said pallet conveyor, one of said stops being actuatable for positioning said pallet in an initial ready position and the second of said stops being actuatable for arresting said pallet in a second position, said pallet having two pairs of side-by-side stacks of flat box blanks so that said pallet is stopped by one of said stops in a position so that said discharge means will discharge both of said front pair of pallets, in succession onto said stack conveyor, and wherein said second stop is actuatable for arresting said pallet in a position such that said back pair of stacks are aligned with said discharge means and wherein said discharge means, upon actuation, moves said rear pair of said stacks sidewise off of said pallet and onto said stack conveyor, in succession behind said first pair of stacks.

18. An apparatus for delivering stacks of flat box blanks to an erector machine of the type having an elevator movable between a lower position and an upper position, for receiving on the elevator a stack of said flat box blanks, when said elevator is in its lower position and so that the elevator, thereafter, lifts said stack of said blanks such that successive topmost blanks in said stack are removed one-at-a-time from the top of said stack for being manipulated in said machine, the improvement comprising:

(a) a pallet conveyor disposed adjacent to said machine, said pallet conveyor having an entrance end portion and a pallet ready position, said pallet conveyor being adapted to transport at least one pallet, having thereon at least one stack of said flat box blanks, along a path of travel from said entrance end to said pallet ready position;

(b) means for arresting the travel of said pallet when said pallet is in said ready position on said pallet conveyor;

(c) a discharge member disposed adjacent to said conveyor for urging said stack of box blanks sidewise off of said pallet;

(d) a stack conveyor extending from said pallet conveyor for receiving said stack of box blanks when said stack is discharged from said pallet, and for delivering said stack of box blanks to said elevator, when said elevator is in its lowered position;

(e) control means for controlling the actuation and deactuation of said pallet conveyor and said discharge member and said stack conveyor and said elevator; and (f) at least one stack of said flat box blanks includes two stacks disposed side-by-side on said pallet and wherein said discharge member is adapted to engage one of said stacks of flat box blanks for moving said one of said flat box blanks against the other of said stacks of said flat box blanks for urging the other of said stack of said flat box blanks off of said pallet and onto said stack conveyor and for, thereafter, urging said one of said flat box blanks off of said pallet and onto said stack conveyor.

19. An apparatus for delivering stacks of flat box blanks to an erector machine of the type having an elevator movable between a lower position and an upper position, for receiving on the elevator a stack of said flat box blanks, when said elevator is in its lower position and so that the elevator, thereafter, lifts said stack of said blanks such that successive topmost blanks in said stack are removed one-at-a-time from the top of said stack for being manipulated in said machine, the improvement comprising:

(a) a pallet conveyor disposed adjacent to said machine, said pallet conveyor having an entrance end portion and a pallet ready position, said pallet conveyor being adapted to transport at least one pallet, having thereon at least one stack of said flat box blanks, along a path of travel from said entrance end to said pallet ready position;

(b) means for arresting the travel of said pallet when said pallet is in said ready position on said pallet conveyor;

(c) a discharge member disposed adjacent to said conveyor for urging said stack of box blanks sidewise off of said pallet;

(d) a stack conveyor extending from said pallet conveyor for receiving said stack of box blanks when said stack is discharged from said pallet, and for delivering said stack of box blanks to said elevator, when said elevator is in its lowered position;

(e) control means for controlling the actuation and deactuation of said pallet conveyor and said discharge member and said stack conveyor and said elevator;

(f) said pallet supporting a plurality of four stacks of box blanks arranged in two rows of transversely aligned stacks of box blanks; and (g) means for manipulating said discharge member for urging the two stacks of box blanks sidewise so that they successively are discharged onto said stack conveyor, said control means controlling the movement of said pallet so as to move said pallet to a second position in which the rear row of said stacks of pallets are aligned with said pallet conveyor, said control means also controlling said discharge member for urging the rear row of stacks of box blanks sidewise onto said stack conveyor so that they are successively received thereon.

* * * * *